US005782436A

United States Patent [19]
Pohling

[11] Patent Number: 5,782,436
[45] Date of Patent: Jul. 21, 1998

[54] TORQUE TUBE BREAKOUT MECHANISM

[75] Inventor: John G. Pohling, Buena Park, Calif.

[73] Assignee: McDonnell Douglas Corporation, Long Beach, Calif.

[21] Appl. No.: 588,749

[22] Filed: Jan. 19, 1996

[51] Int. Cl.$^6$ .............................. B64C 13/12; B64C 13/44
[52] U.S. Cl. ................................ 244/229; 244/224
[58] Field of Search .......................... 244/234, 224, 244/229, 231

[56] References Cited

U.S. PATENT DOCUMENTS

| | | | |
|---|---|---|---|
| 1,304,420 | 5/1919 | Verner | 244/229 |
| 1,327,183 | 1/1920 | Van Allen | 244/229 |
| 2,162,150 | 6/1939 | Wolf | 244/229 |
| 4,403,756 | 9/1983 | Berlin et al. | 244/229 |
| 4,473,203 | 9/1984 | Barnoin et al. | 244/229 |
| 5,427,336 | 6/1995 | Haggerty et al. | 244/234 |

OTHER PUBLICATIONS

Declaration of John Pohling dated Jan. 17, 1996 "History of 1st embodiment and sales contracts".

*Primary Examiner*—Virna Lissi Mojica
*Attorney, Agent, or Firm*—Bell Seltzer Intellecutal Property Group of Alston & Bird, LLP

[57] ABSTRACT

A disconnect assembly which is positioned between respective sections of the torque bar for control column controls and permits alternative connection or disconnection of the sections of the control torque bar. This disconnect structure can be included on any or all of the control column torque bars for operating any of the control surfaces of the aircraft.

The torque tube disconnect assembly includes a lever rotatably attached to one side of the first torque tube section which has a pair of recesses and a central recess for receiving a pin mounted on a swivel bar. The opposite end of the swivel bar has an interconnect apparatus for engaging the end of the second torque tube section immediately adjacent the first torque tube section. The swivel bar has a pair of arms on either side thereof each of which rotatably supports a separate articulated link for each such arm. The opposite end of each such link is attached to an axle on a mount fixedly attached to said first torque tube section. When a sufficient amount of force is exerted on the un-jammed control, the connection of the swivel arm to one side of the torque tube will disconnect due to the force applied overcoming the force of the spring holding connection in place. Dependent upon the direction the control column is moving the swivel arm will reset to one or the other of the recesses. When disconnect occurs the bottom of the swivel bar is pulled upward by the force of the spring and disengages from opposite torque tube which disengages one control column from the other.

22 Claims, 7 Drawing Sheets

TORQUE TUBE BREAKOUT MECHANISM

BACKGROUND OF THE INVENTION

1. Field of the Invention

The field of this invention relates to disconnect or override mechanisms in dual control aircraft. More specifically this invention relates to disconnect apparatus which permits automatic disconnection of a jammed control of a dual control aircraft and permits continued use of such controls with un-jammed control column or rudder pedals.

2. Description of Related Art

Currently there is no breakout mechanism on early aircraft although some aircraft designs provide override capability on certain control surfaces. These override systems are extremely bulky and employ multiple cams for engaging the torque bar connecting the control columns which provides some temporary disconnect feature. Such override mechanisms are very bulky, secured in place by a vary large centering spring and are mechanically complex. In the event of a control circuit jam such as in the control column, significant force is required to override the jammed control. In addition, the override will reset when the cams realign and require the pilot to repeatedly exert great force to override the jammed control column.

It is desirable to provide a control column breakout mechanism which implements a simplified disconnect which may be easily operated by minimal force and does not utilize multiple cam engagement.

SUMMARY OF THE INVENTION

The instant invention is a disconnect assembly which is positioned between respective sections of the torque bar for control column controls and permits alternative connection or disconnection of the sections of the control torque bar. This disconnect structure can be included on any or all of the control column torque bars for operating any of the control surfaces of the aircraft.

The torque tube disconnect assembly includes a lever rotatably attached to one side of a first torque tube section, which has a pair of symmetrical recesses and a central recess for receiving a pin mounted on an swivel bar. The opposite end of the swivel bar has a recess for receiving a pin attached to the side of the second torque tube section immediately adjacent the first torque tube section (in the event that the pin is rectangular or provided with vertical sides the pin must be attached in such a way as to permit slight rotation to allow disconnect) or alternatively a partial spherical member received by an annular ring mounted on a modified pin attached to the second torque tube section. The swivel bar has a pair of arms on either side thereof. Each such arm having a hole for receiving an axle for rotatably mounting a separate articulated link for each such arm. The opposite end of each such link is attached to an axle on a mount attached to said first torque tube section. The swivel bar is held in place by a spring attached at one end to a pin on the swivel bar and at the other end to the lever.

When, for example, the control column is jammed, the torque tube associated with the elevators is prevented from turning. However, when a force is exerted on the un-jammed control column, the pin centered in the central recess of the lever will dislodge from the recess due to the applied force overcoming the force of the spring holding the pin in place. Dependent upon the direction the control column is moving, the pin of the swivel bar will reset to one or the other of the recesses in the lever. When this occurs the bottom of the swivel bar is pulled upward by the force of the spring and disengages from the engagement pin, or alternatively the spherical member disengages from the annular ring on the opposite torque tube thereby disengaging the free control column from the jammed control column. Re-engagement of the pin or the spherical member does not occur until such disconnect is manually reset.

Accordingly, it is an object of this invention to provide a disconnect which utilizes a relatively small spring compared with prior override systems.

It is a further object of this invention to provide a disconnect which utilizes selected ratios between the operative elements which hold the disconnect in place but permit adjustment of the force required to disconnect the column controls by rearrangement of elements.

DESCRIPTION OF THE PREFERRED EMBODIMENT(S)

Figure 1:
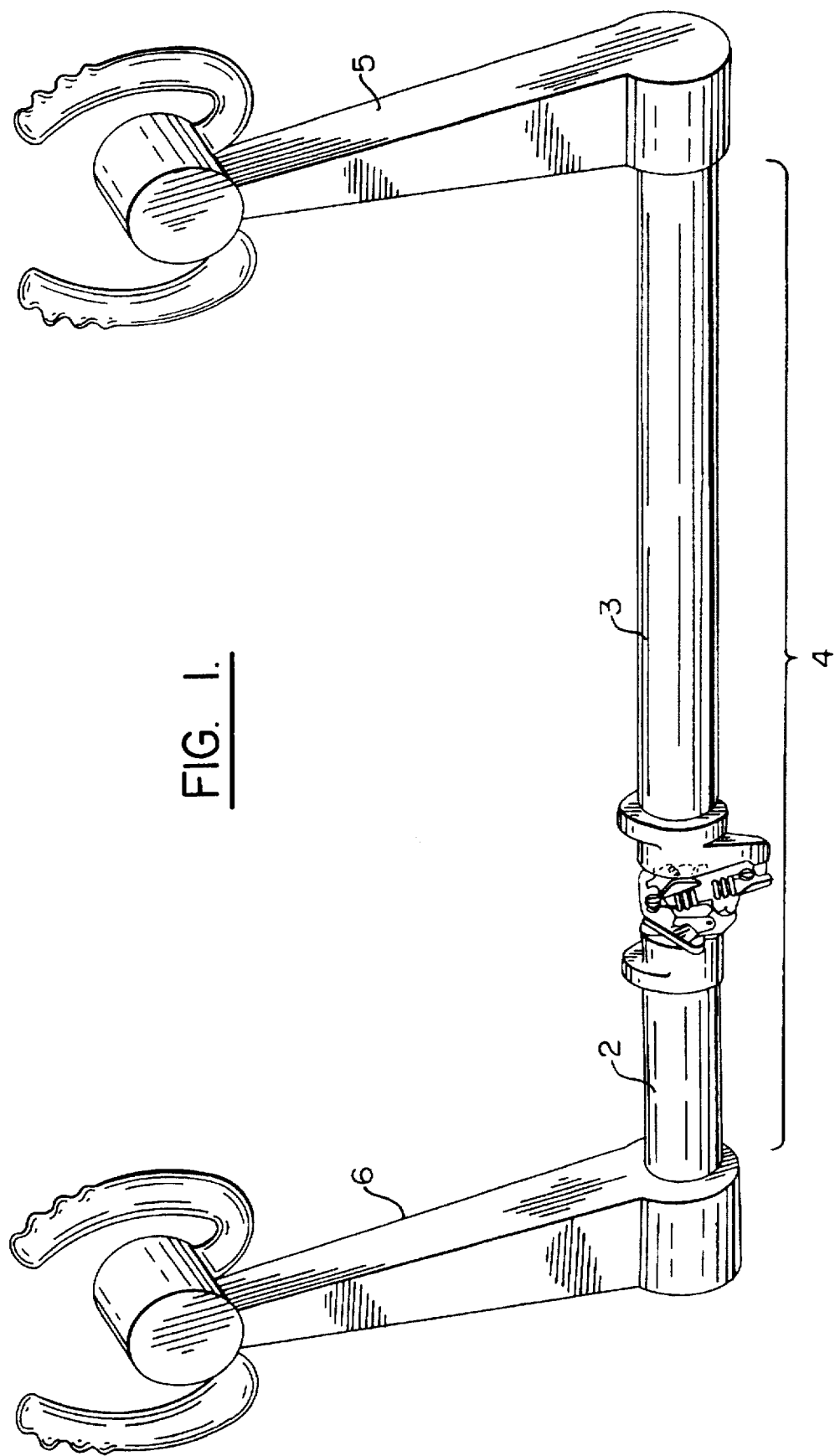
FIG. 1 is an overall perspective view of the control column disconnect in the locked position relative to the control column.

Referring to FIG. 1, the instant invention is a disconnect assembly 1 which is positioned between right and left sections 2 and 3 respectively of the torque bar 4 for right and left control column controls 5 and 6 respectively. The control column breakout mechanism 1 permits alternative connection or disconnection of the sections 2 and 3 of the control column torque bar 4. This disconnect assembly 1 can be included on any or all of the control torque bars associated with the controls for operating any of the control surfaces of the aircraft.

Figure 2:
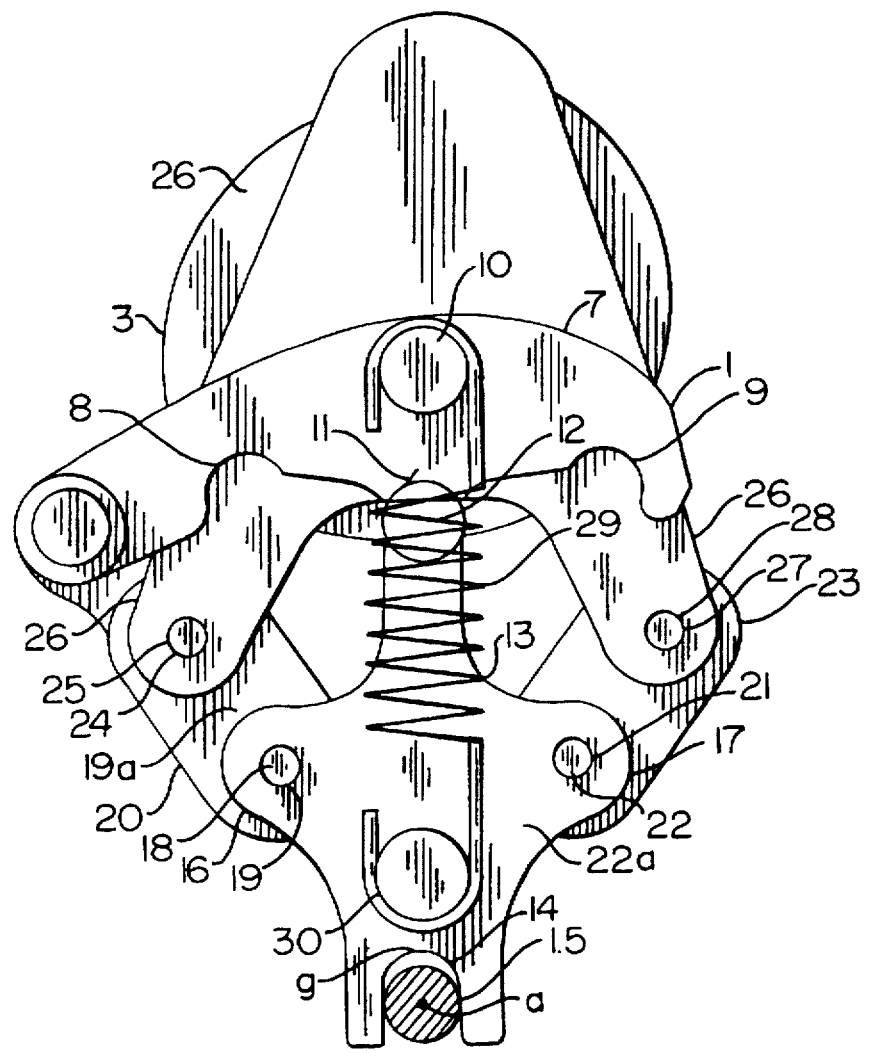
FIG. 2 is a frontal view of the slotted control column disconnect in the locked position.

With respect to FIG. 2, the torque tube 4 disconnect assembly 1 includes a lever 7 rotatably attached to one side of the first torque tube section 2 which lever 7 has a pair of recesses 8 and 9 disposed on either side of a pinion 10 and a central recess 11 position below the pinion 10 for receiving a pin 12 mounted on a swivel bar 13. The opposite end of the swivel bar 13 has a "U" shaped recess 14 for receiving a pin 15 attached to the end of the torque tube section 3 and disposed toward torque tube section 2 along its longitudinal axis (in the event that the pin is provided with vertical sides the pin must be attached in such a way as to permit slight rotation approximately 20° to allow disconnect of swivel bar recess 14). The swivel bar 13 has a pair of arms 16 and 17 disposed on either side thereof. The arm 16 has a hole 18 for receiving an arm axle 19 for rotatably mounting a first articulated link 20 for such arm 16. The articulated link is adapted to rotate about said arm axle 19 relative to said arm 16. The arm 17 has a hole 21 for receiving an arm axle 22 for rotatably mounting a second articulated link 23 for such arm 17. The second articulated link 23 is adapted to rotate about said arm axle 22 relative to said arm 17. The opposite end of the first articulated link 20 has a hole 24 for receiving a first axle 25 attached to a mount 26, which mount 26 is attached to torque tube section 2 or may be made integral therewith. Similarly, the opposite end of the second articulated link 23 has a hole 27 for receiving a second axle 28 on said mount 26. The mount 26 is a generally inverted "U" shaped member (although the shape of the mount is not critical) attached to torque tube section 2 and is adapted for rotatably receiving each of said first and second articulated links 20 and 23 at the ends of the arms of said U of mount 26. A spring 29 is mounted on the swivel bar 13 and attached at one end to a pin 30 attached to the swivel bar 13 at a point adjacent the top of the "U" shaped slot 14. Said spring 29 is attached at the other end to pinion 10.

Figure 4:
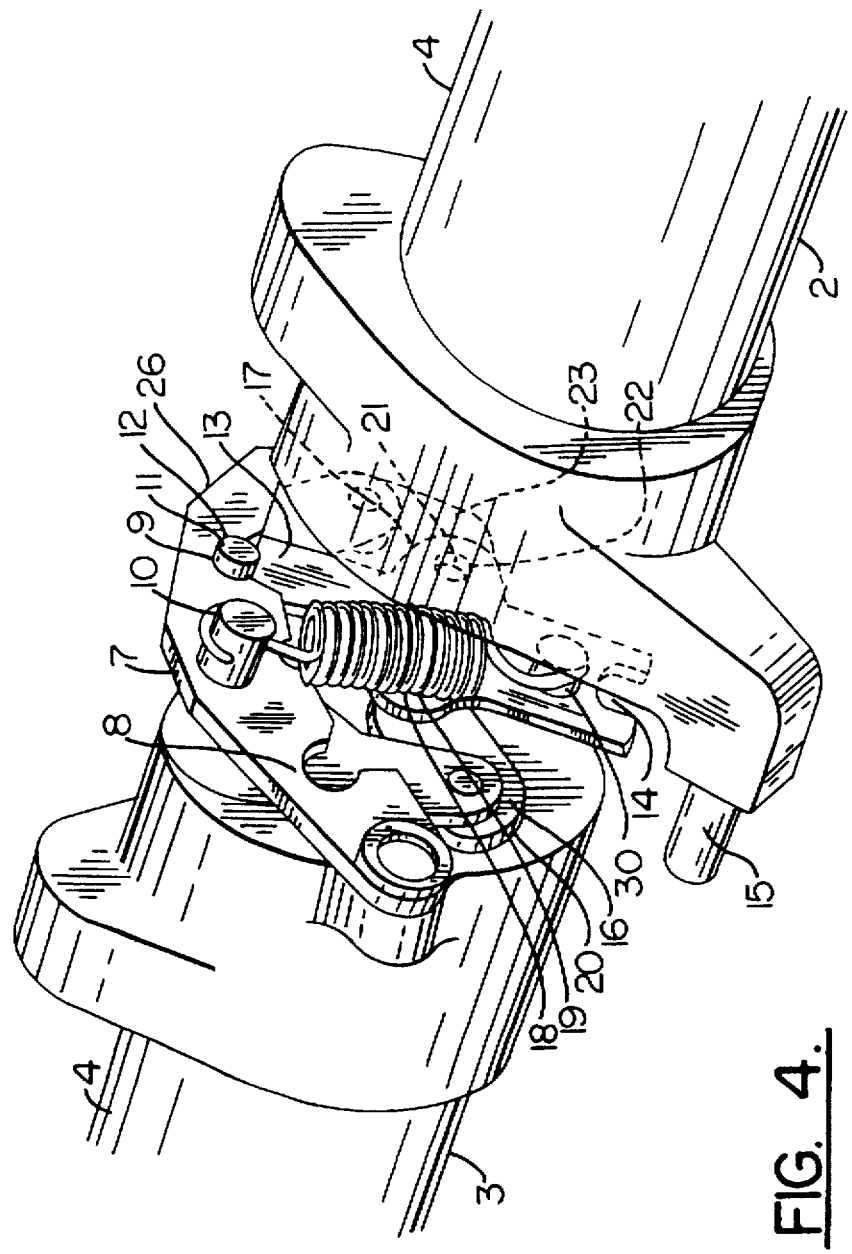
FIG. 4 is a perspective view of the control column disconnect in the unlocked position.

When, for example, the control column 5 is jammed, the torque tube 4 associated with the control column such as the elevator controls is prevented from turning. However, when a sufficient amount of force to overcome the bias of spring 29 is exerted on the un-jammed control column 6, the pin 12 centered in the recess 11 of the lever 7 will cause the lever 7 to rotate upwards and dislodge from the recess 11 due to the force applied overcoming the force of the spring 29 which was holding the pin 12 in place as shown in FIG. 4. Dependent upon the direction the of force applied to the control column, the pin 12 of the swivel bar 13 will reset to one or the other of the recesses 8 or 9. When this occurs the bottom of the swivel bar 13 is pulled upward by the force of the spring 29 and disengages from engagement with the pin 15 mounted on the opposite torque tube section 3. This disengages the control column 6 from the jammed control column 5. Re-engagement of the pin does not occur until the disconnect 1 is manually reset.

The absolute value of the ratio of the distance "fg" defined between the axis "f" of the pin 12 and the intersection point "g" of the line 19a passing through axles 19 and 25 and the line 22a passing through axles 22 and 28 when the apparatus is in the connected position, and the distance "ag" defined between point g and the axis "a" of pin 15 determines the bias strength of the spring required in the particular geometry. The larger the ratio the smaller the bias strength in the spring required to hold the mechanism in place and for producing the desired disconnect force at the control wheel. The smaller the ratio the larger the bias strength required in the spring to produce the same disconnect force. These ratios can be adjusted for particular aircraft as required.

For the McDonnell Douglas MD 90 aircraft, for example, the ratio is 10:1 (ie. 3.75 inches/0.375 inches) and the spring used has a tensile strength of approximately 40 lbs preload. The spring expands to a length of approximately 3.6 inches (91.4 cm) and collapses to a length of approximately 3.02 inches (76.7 cm). Other spring strength, ratios and expansion and collapsing lengths may be used dependent on the particular aircraft and breakout force requirements and the invention is not limited to the implementation described.

Thus, when one side of operator controls becomes jammed the un-jammed control permits continued operation on disconnect. Since the swivel arm has articulatable links, it swings out of the way of pin 15 when dislodged. The system must be manually reset in order to reengage the disconnected control column.

The specific mounting of the torque tube has not been shown as it is well known in the art.

Figure 3:
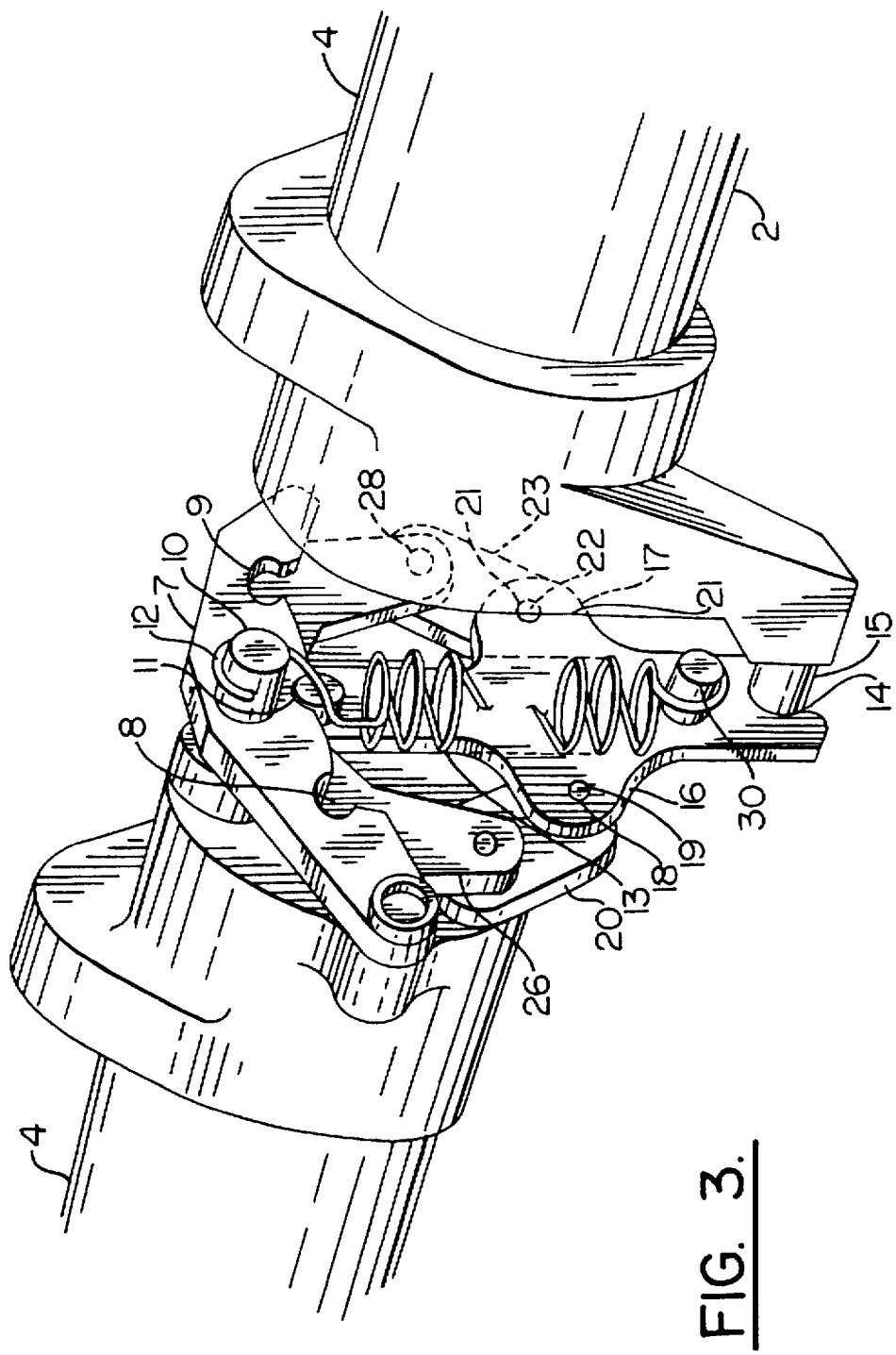
FIG. 3 is a perspective view of the control column disconnect in the locked position.

Referring to FIG. 3, the breakout mechanism 1 is shown in perspective form mounted to torque tube sections 2 and 3 and interconnecting the same.

Referring to FIG. 4, the breakout mechanism 1 is shown in perspective form in the disconnected position. Here the swivel bar 13 is shown in a rotated position tilted away from the pin 15 thereby disconnecting torque tube section 2 from torque tube section 3. In this particular position, the pin 12 has been forced toward recess 9 and has been received by it. The breakout mechanism 1 will remain in the disconnected position until manually reset.

Figure 5:
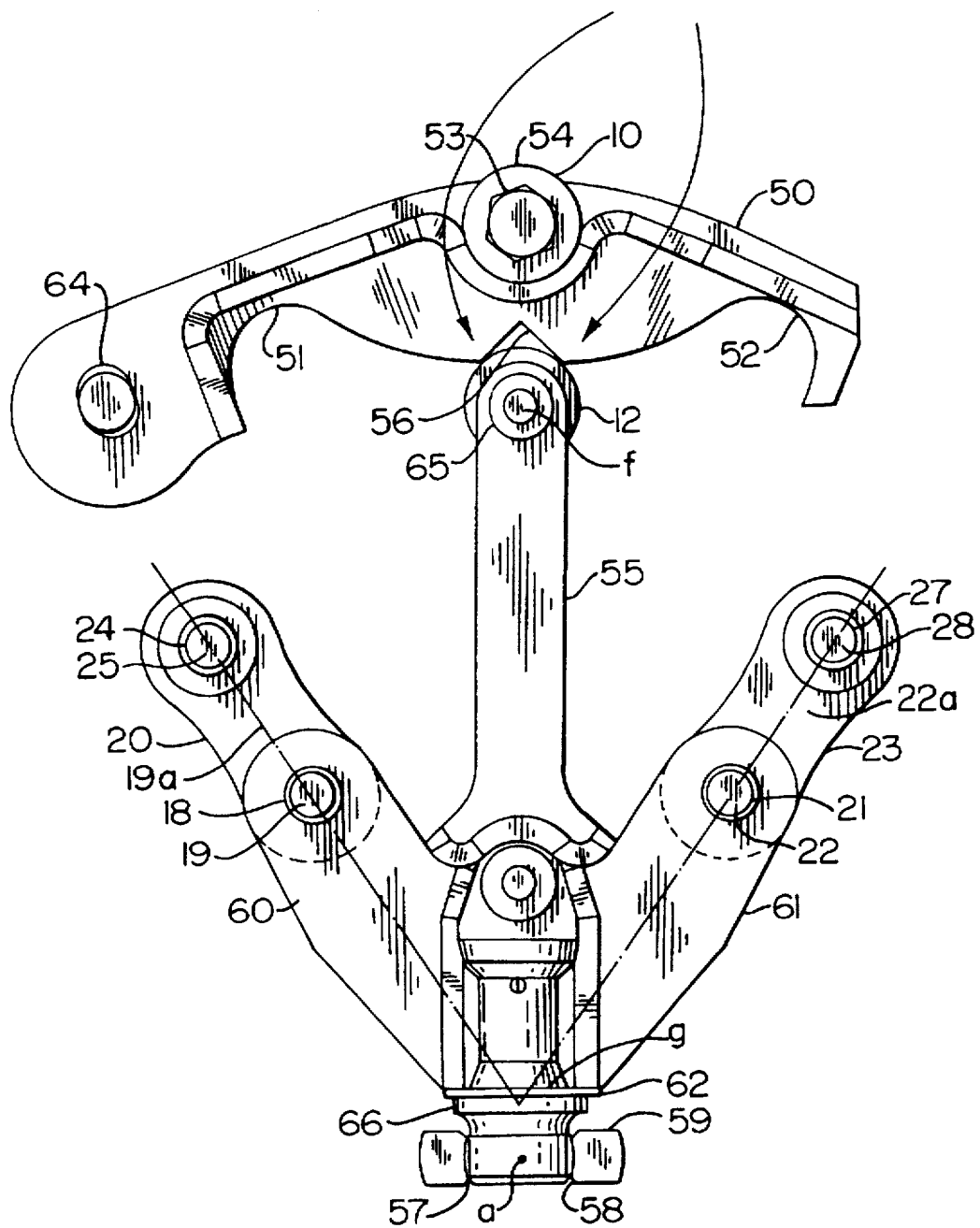
FIG. 5 is a partial frontal view of the spherical section alternative control column disconnect in the locked position.

Referring to FIG. 5, an alterative embodiment of the invention incorporates an alternate interface between the two sides of the breakout mechanism to accommodate manufacturing tolerances and to avoid structural misalignment and deflection under load, which can cause the pin 15 to jam in the slot 14 thus increasing friction before breakout. In addition, the pin 15 can under certain circumstances ride up and down the slot 14 under load and effectively alter the ratio of fg:ag. The alternative embodiment comprises a modification of lever 7 forming a lever 50 which is also rotatably attached to one side of the first torque tube section 2 (not shown) through a hole 64 in a manner similar to that of lever 7 as shown in FIG. 2. Said lever 50 has a pair of recesses 51 and 52 disposed on either side of said pinion 10 which is bolted to the lever 50 by bolt 53 and washer 54 so that pinion 10 may be permitted to rotate relative thereto. The recesses 51 and 52 are shaped slightly different from the recesses 8 and 9 of lever 7 as shown in FIGS. 2, 3, and 4 and have gradual sloping sides toward the center up to the edges of a central recess 56. This facilitates ease of disconnect as well as manual reset and minimizes wear on the surface of the pin 12. The edges of the central recess 56 are disposed at a 45° angle which requires a 40 pounds cam out force for a 40 pounds spring force. Accordingly, curvature is introduced to the sides of the recess 56 as the sides transition toward the recesses 51 and 52. As a result, the effective cam out force gets increasingly less as the radius of the introduced curvature gets larger. In addition, pinion 12 may be mounted to swivel bar 55 through a bearing 65 which is adapted to permit rotation of the pinion 12 relative to the swivel bar 55. The central recess 56 is positioned below the pinion 10 and adapted for receiving the pin 12 mounted on swivel bar 55. The opposite end of the swivel bar 55 has a spherical section 57 which is inserted into a cylindrical annular hole or recess 58 of a ring 59 mounted on the end of pin 15 which is attached to the side of the torque tube section 3 and disposed toward torque tube section 2 along its longitudinal axis. The ring 59 does not rotate but can translate in and out along the longitudinal axis of its supporting pin to accommodate misalignment. The operation in the second embodiment is essentially identical to the first embodiment except that the ring and ball structure fixes the ratio fg:ag by maintaining the contact of the curve of the ball with the ring always at the same distance "ag" which cannot change under load. The swivel bar 55 has a pair of arms 60 and 61 disposed on either side thereof as described in the first embodiment set forth herein, which support articulated arms 20 and 23 and which operate in the same manner with the mount 26 (not shown) as described above for arms 16 and 17 in FIGS. 2,3, and 4. The spherical section 57 is used in place of the slot 14 on the end of the swivel bar and is adapted to slide in and out of the ring 59 which acts as a drive crank. The curved sides of the spherical section 57 facilitate rotation of the swivel bar 55 on disengagement of the breakout mechanism. This embodiment permits operation even if there is some misalignment between the left and right columns in all axes and can be used to adjust the mechanical ratios of the mechanism and alter the column breakout force. This is accomplished by adjustment of the longitudinal position of the spherical section 57 relative to the swivel bar 55 by increasing or decreasing the thickness of an adjustment washer 62, which is held in place by either bolting the spherical section 57 to the swivel bar 55 or providing a threaded body having a hexagon portion 66 for placement of a wrench made integral with the spherical section 57 and bolting the threaded body directly to the bottom of the swivel bar 55 in a screw threaded recess (not shown).

Figure 6:
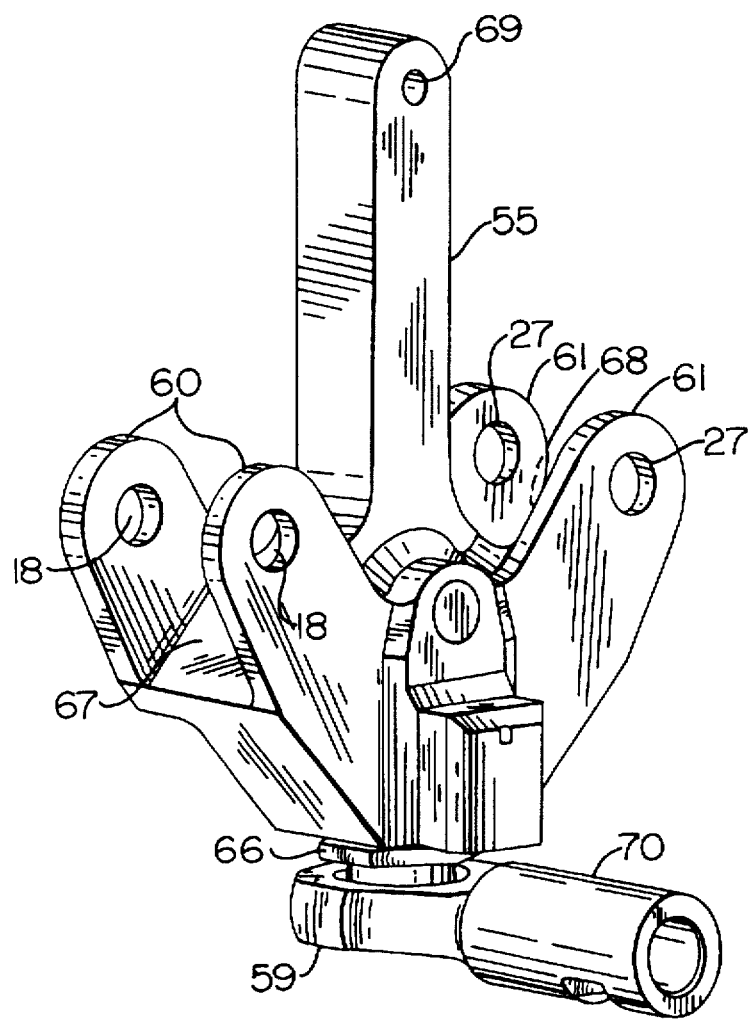
FIG. 6 is a perspective view of the swivel bar with the spherical alternative control column disconnect structure.

FIG. 6 is a perspective view of the alternative embodiment of the swivel bar 55 showing each of the arms 60 and 61 as a pair of arms spaced apart to form a slot 67 and 68 respectively for receiving articulated arms 20 and 21. A hole 69 is provided at the top of said swivel bar for receiving bearing 65 to mount pinion 12. Referring to the bottom of FIG. 6 the ring 59 is shown mounted to a coupling bracket 70 which couples said ring 59 to pin 15 and permits motion or adjustment thereof along the longitudinal axis of pin 15. Alternatively ring 59 may be made integral with pin 15.

Other specific embodiments of the spherical section 57 and the slot 14 and the pin 15 and the ring 59 respectively which are equivalents thereof are considered within the scope of the invention described, and this invention is not limited to the specific structure disclosed.

Figure 7:
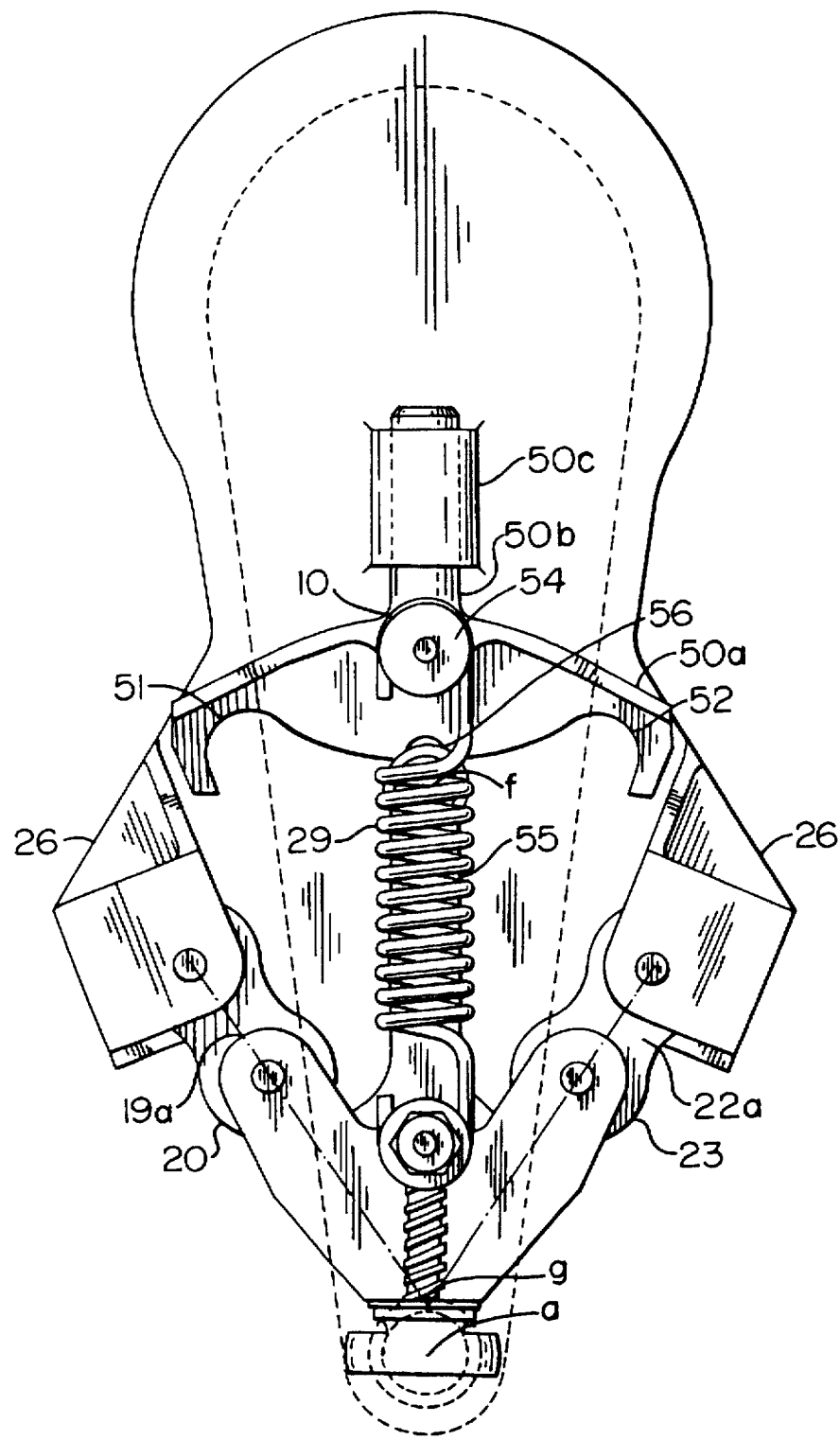
FIG. 7 is a frontal view of the control column disconnect with a slider lever.

FIG. 7 shows an alternate lever structure. Lever 50a is attached to a slider 50b which is adapted to slide up and down a bracket 50c attached to torque tube section 3. The operation of the lever 50a is otherwise identical to lever 50. Other mounting configurations may be implemented which accomplish the same function and the invention is not limited to the manner of mounting.

Having thus described the invention, what is claimed is:

1. A torque tube disconnect apparatus disposed between torque tube sections comprising:
   a. a lever attached at one end to a first torque tube section and adapted to move relative to said first torque tube section, the lever including a first recess in said lever and at least one adjacent recess;
   b. a swivel bar adapted for selective engagement with the recesses of said lever and adapted for releasably engaging a second torque tube section, said swivel bar further having a pair of arms;
   c. a pair of articulatable links each rotatably attached separately to one of said arms at one end of said links, said links adapted for rotation relative to said arms;
   d. a mount attached to said first torque tube section adapted for rotatably receiving each of the articulatable links, said links spaced apart from one another and adapted to rotate relative to said mount; and
   e. a spring adapted for attachment to said lever at one end and to said swivel bar at the other.

2. A torque tube disconnect apparatus disposed between adjacent ends of two sections of a torque tube, comprising:
   a. a lever attached to a first section of said torque tube adapted for changing position on application of torque between sections of said torque tube;
   b. a swivel bar adapted for engaging said lever; and
   c. a support fixedly attached to a second section of said torque tube adapted for releasably engaging said swivel bar.

3. A torque tube disconnect apparatus as described in claim 2 wherein said lever further comprises:
   a. at least two selected engagement positions along the length of said lever adapted for engaging a part of said swivel bar.

4. A control system disconnect apparatus as described in claim 3 wherein said lever is movably attached to said first section of said torque tube, said lever having recesses located at said engagement positions adapted for receiving a part of said swivel bar.

5. A control system disconnect apparatus as described in claim 4 further comprising a spring for biasing said swivel bar toward said lever.

6. A control system disconnect apparatus as described in claim 5 wherein said spring is engaged at one end to said swivel bar and at the other end to said lever and adapted to bias said swivel bar and said lever toward one another and into engagement with the recesses of said lever.

7. A torque tube disconnect apparatus as described in claim 6 further comprising a mount attached to said first section of said torque tube for receiving a pair of links rotatably attached via axles to said mount and to said swivel bar, said links being adapted for rotation relative to said mount and said swivel bar about said axles.

8. A control system disconnect apparatus as described in claim 7 wherein the ratio of the distance between the point at which the swivel bar engages said first torque tube section and the intersection point of lines passing through the longitudinal axis of each of said articulatable links, when in the engaged position, is less than the distance between said intersection point and the point at which the swivel bar engages said second torque tube section.

9. A torque tube disconnect apparatus as described in claim 8 wherein said swivel bar includes a pair of arms each of which receives one of said axles, said arms being symmetrically disposed about the central axis of said swivel bar.

10. A control system disconnect apparatus as described in claim 9 wherein said links are disposed about the central axis of said mount and permit said swivel bar to rotate relative to said mount in a direction opposite to the direction of rotation of said links.

11. A torque tube disconnect apparatus disposed between at least two sections of a torque tube comprising:
   a. a lever attached to a first section of said torque tube adapted for changing position on application of torque between sections of said torque tube;
   b. a swivel bar adapted for engaging said lever and having a ring engaging member; and
   c. a ring attached to a second section of said torque tube and adapted for releasably engaging said ring engaging member of said swivel bar upon application of torque between sections of said torque tube.

12. A torque tube disconnect apparatus as described in claim 11 wherein said lever further comprises at least two engaging positions spaced apart along the length of said lever adapted to receive a portion of said lever.

13. A control system disconnect apparatus as described in claim 12 wherein said lever is rotatably attached to said first section of said torque tube, said lever having recesses located at said engaging positions each adapted for alternatively engaging said swivel bar.

14. A control system disconnect apparatus as described in claim 13 further comprising a spring for biasing said swivel bar into engagement with selective ones of the recesses of said lever.

15. A control system disconnect apparatus as described in claim 14 wherein said spring is engaged at one end to said swivel bar and at the other end to said lever and adapted to bias said swivel bar and said lever toward one another.

16. A control system disconnect apparatus as described in claim 15 wherein the distance between the point at which the swivel bar engages said first torque tube section and the intersection point of lines passing through the axles of each of said articulatable links, when in the engaged position, is less than the distance between said intersection point and the point of engagement with said second torque tube section.

17. A control system disconnect apparatus as described in claim 16 further comprising an annular ring mounted to said second section of said torque tube and disposed generally perpendicular to said swivel bar and adapted for releaseably receiving a spherical section of said swivel bar.

18. A control system disconnect apparatus as described in claim 17 wherein said swivel bar is selectively received by at least one recess of said lever in an engagement position and by at least one other recess of said lever in a disengagement position.

19. A torque tube disconnect apparatus disposed between two operating sections comprising:
   a. a lever attached at one end to a first operating section and adapted to move relative to said first operating section, a first recess in said lever and at least one adjacent recess;
   b. a swivel bar having a pair of symmetrical arms, an elongated central section and a base, said elongated central section adapted for selective engagement with the recesses of said lever and said base adapted for releasably engaging a second operating section;
   c. a pair of articulatable links each rotatably attached separately to selected ones of said arms at one end of said links, said links adapted for rotation relative to said arms;
   d. a mount attached to said first operating section adapted for rotatably receiving each of the articulatable links at the ends opposite the attachment to said arms, said links spaced apart from one another and adapted to rotate relative to said mount; and
   e. a spring adapted for attachment to the lever at one end and to the base of said swivel bar at the other.

20. The control system disconnect apparatus as described in claim 19 wherein said swivel bar further comprises a first engagement member adapted for engaging said second operating section at second engagement member attached to said second operating section.

21. The control system disconnect apparatus as described in claim 20 wherein said first engagement member comprises a slot and said second engagement member comprises a pin received by said slot.

22. The control system disconnect apparatus as described in claim 21 wherein said first engagement member comprises a spherical section attached to the base of said lever and said second engagement member comprises a ring having a cylindrical hole therein for receiving said spherical section.

* * * * *

UNITED STATES PATENT AND TRADEMARK OFFICE
CERTIFICATE OF CORRECTION

PATENT NO. : 5,782,436
DATED : July 21, 1998
INVENTOR(S) : Pohling

It is certified that error appears in the above-identified patent and that said Letters Patent is hereby corrected as shown below:

Column 6, lines 1, 6, 9, 20, 32, 52, 57, 61, and 65, "control system", each occurrence, should be --torque tube--.

Column 7, lines 5 and 10, "control system", each occurrence, should be --torque tube--; line 8, "releaseably" should be --releasably--.

Column 8, lines 10, 15, and 20, "control system", each occurrence, should be --torque tube--; line 13, "at" should be --and a--.

Signed and Sealed this

Seventeenth Day of November, 1998

Attest:

BRUCE LEHMAN

*Attesting Officer*     *Commissioner of Patents and Trademarks*